July 25, 1961  YUZO MIURA ET AL  2,993,234
METHOD OF MANUFACTURING ANTISTATIC RECORD DISKS
Filed Oct. 27, 1958

INVENTORS
YUZO MIURA, TOMOMICHI TSUKADA and SHIZUO HAYASHI
BY
ATTORNEYS

United States Patent Office 2,993,234
Patented July 25, 1961

2,993,234
METHOD OF MANUFACTURING ANTISTATIC RECORD DISKS
Yuzo Miura, Tokyo, Tomomichi Tsukada, Kawasaki-shi, and Shizuo Hayashi, Tsurumi-ku, Yokohama, Japan, assignors to Tokyo Shibaura Electric Co., Ltd., Kawasaki-shi, Japan, a corporation of Japan
Filed Oct. 27, 1958, Ser. No. 769,951
Claims priority, application Japan Feb. 28, 1958
22 Claims. (Cl. 18—48.3)

This invention relates to a method of manufacturing antistatic moldings. More particularly the invention relates to a method of obtaining antistatic phonograph record disks wherein a composite made by mixing a small amount of an antistatic agent with a fine resin powder composed mainly of vinyl chloride or a vinyl chloride copolymer is heated and pressed without being rolled.

The conventional moldings consisting mainly of vinyl chloride or a vinyl chloride copolymer have an undesirable property of adsorbing dust due to the accumulation of static electric charges, a conspicuous example thereof being seen in phonograph records. That is to say, the conventional long playing phonograph records are made by a method wherein a small amount of a stabilizing agent or a coloring agent is mixed with a principal composition which is a vinyl chloride-vinyl acetate copolymer and the mixture is rolled by means of a Banbury mixer, heat roll or extruder, is then formed into a lamina (biscuit) or pellets, is preheated and softened, is inserted between stampers and is heated and pressed to be molded. As the main composition of the thus manufactured record is an insulator, the generated static electric charge is accumulated on the surfaces during the handling and, as a result, absorbs dust from the air. It is very difficult to remove such dust. When dust adheres to the grooves of the record, damage is caused to the tone quality.

Therefore, various measures have been taken to prevent the generation of such static charges on the surfaces of records. For example, record surfaces have been wiped with paper or cloth containing a suitable surface active agent. However, none of the effects of such measures is permanent and it is necessary to re-treat the surfaces from time to time. In some cases, the solvent may not completely evaporate, the antistatic agent may be added in excess or impurities may exist in the solvent, stickiness being thus given to the record surfaces. Therefore, dust particles will adhere to the record surfaces or the surfaces will be dissolved.

An object of the present invention is to obtain ever clean phonograph records by adding an antistatic agent to the powder of the base material of the record disks without hot-rolling. Another object of the present invention is to inhibit flow of particles.

The other object of the present invention is to manufacture record disks in which an antistatic agent remains in a stable state.

A further object of the present invention is to manufacture phonograph records in which a high antistatic effect is obtained by using a small amount of an antistatic agent.

Another object of the present invention is to provide a method of manufacturing record disks of a further improved tone quality.

A still further object of the present invention is to obtain uniform products of a further improved tone quality.

Other objects of the present invention will clearly be understood from the following descriptions.

The present invention relates to a manufacturing method whereby the generation of static electric charges on record disks made mainly of the resin composition of vinyl chloride or a vinyl chloride copolymer is semi-permanently prevented. The present invention can be applied not only to phonograph records but also to electric fan blades and lighting fixtures with favorable results.

The figure shows a partial perspective view of a record disk prepared according to this invention. In said figure 1 is the surface of the disk pressed by a flat surface, such as a stamper; 2 is the tone groove formed by a projecting portion of the stamper; 5 is a surface of the groove. The plane surface 1 consists of resin 3 and antistatic agent 4. 4' represents antistatic agent on the groove surface 5, which is rarely seen except near the plane surface 1.

Figure 1:
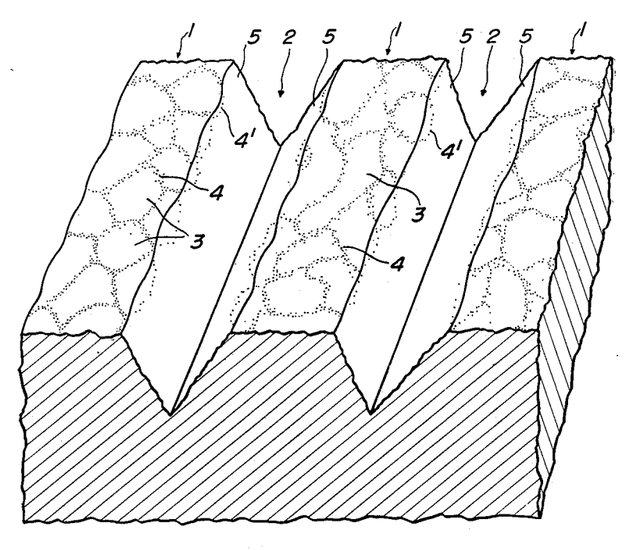

The antistatic agents that can be used in the present invention are as follows:

(A) Cation active agents.
   (i) Quaternary ammonium salts.
      (a) Stearamidopropyldimethyl-$\beta$ - hydroxyethyl ammonium nitrate (produced by American Cyanamid Company).
      (b) Catiogen L (produced by First Industrial Pharmaceutical Company, Ltd. (Daiichi Kogyo Seiyaku Kabushiki Kaisha)).
      (c) Kotamin 18 (Kao Soap Company, Ltd. (Kao Sekken Kabushiki Kaisha)).
      Alkyl trimethyl ammonium chloride.
   (ii) Alkyl pyridinium salts.
      (a) Catiogen H (produced by First Industrial Pharmaceutical Company, Ltd. (Daiichi Kogyo Seiyaku Kabushiki Kaisha)).
      Alkyl pyridinium chloride.
(B) Anion active agents.
   (i) Aliphatic alcohol phosphoric acid ester salts.
      (a) Zelec NE (produced by Du Pont Company).
      (b) Elenon No. 19 (produced by First Industrial Pharmaceutical Company, Ltd. (Daiichi Kogyo Seiyaku Kabushiki Kaisha)).
      Alkyl phosphate.
      (c) Elenon No. 1003 (produced by First Industrial Pharmaceutical Company, Ltd. (Daiichi Kogyo Seiyaku Kabushiki Kaisha)).
(C) Nonion active agents.
   (i) Polyoxyethylene glycol alkyl esters.
      (a) Elenon No. 9 (produced by First Industrial Pharmaceutical Company, Ltd. (Daiichi Kogyo Seiyaku Kabushiki Kaisha)).
   (ii) Polyoxyethylene glycol alkyl ethers.
      (a) Elenon No. 10 (produced by First Industrial Pharmaceutical Company, Ltd. (Daniichi Kogyo Seiyaku Kabushiki Kaisha)).
   (iii) Sorbitan aliphatic acid esters.
      (a) Sorgen 90 (produced by First Industrial Pharmaceutical Company, Ltd. (Daiichi Kogyo Seiyaku Kabushiki Kaisha)).
      Sorbitan monolaurate.
(D) Ampholytic active agents.
   (i) Imidazolin type.
      (a) Amogen No. 8 (produced by First Industrial Pharmaceutical Company, Ltd. (Daiichi Kogyo Seiyaku Kabushiki Kaisha)).
      (b) Lipomin (produced by Lion Oil and Fat Company, Ltd. (Lion Yushi Kabushiki Kaisha)).
   (ii) Betain type.
      (a) Amogen K (produced by First Industrial Pharmaceutical Company, Ltd. (Daiichi Kogyo Seiyaku Kabushiki Kaisha)).
      (b) Anon BT (produced by Japan Oil and Fat Company, Ltd. (Nippon Yushi Kabushiki Kaisha)).

According to the present invention, record disks are manufactured by heating and pressing the composite of a fine resin powder composed mainly of vinyl chloride or a vinyl chloride copolymer mixed with such antistatic agent without hot rolling, and as little flow as possible may be given to the particles of the resin powder. As one of the methods of mixing the resin powder and the antistatic agent, it is convenient to coat said resin powder with an organic solvent or an aqueous solution of such antistatic agent by a proper means and dry it. The second mixing method is to mix the resin and the antistatic agent in a powdered state. The amount of use of the antistatic agent is sufficient at 0.2 to 2% by weight against the fine resin powder. Below 0.2%, the antistatic effect will not be sufficient. Above 2%, the antistatic effect will increase unnecessarily and the performance of the resin will be reduced with unfavorable results.

The composite of a resin with an antistatic agent in a well mixed powdered state as alone or with the addition of a small amount of such additive as a stabilizing agent, coloring agent or filler is heated and pressed so that as little flow as possible may be given to the particles of the powder. Or the composite is formed into tablets of a fixed shape and is heated and pressed by being inserted between manufacturing stampers as preheated or without being preheated. Needless to say, the powder of a stabilizing agent, coloring agent or filler may be coated or mixed with an antistatic agent. Or a powder may be first made by coating or mixing 10 to 50% of a resin to be used with a concentrated antistatic agent and may then be mixed with a resin powder so that the desired amount of the antistatic agent may be contained.

In preparing the composite powder in the present invention, another method may be used. That is to say, other additives, such as a resin stabilizing agent, coloring agent and filler, than an antistatic agent are first added to a resin. The mixture is then hot rolled and dried and is crushed into a powder of less than A.S.T.M. Sieve Series No. 50 screen and a composite powder is made by mixing an antistatic agent with said powder.

There are basic lead stearate and dibutyl tin dilaurate as stabilizing agents for vinyl chloride series resins. The rate of addition of such stabilizing agent to a resin is less than 1.5% by weight. There are carbon powders and celliton dyes as coloring agents. The rate of addition of such coloring agent to a resin is less than 1.5% by weight. The filler is calcium carbonate, slate powder or the like. The adding rate is less than 50% by weight.

Giving as little flow as possible to the particles of the powder at the time of heating and pressing means fusing and pressing to such an extent that it will cause as little fusing and rolling action as possible. The flow is adjusted mainly by the selection of the heating temperature and the pressure of the press. Further, it is needless to say that no vibration should be given purposely.

When a fine resin powder coated or mixed with an antistatic agent is rolled by means of a Banbury mixer, hot roll or extruder as in the conventional manufacturing method, there will be required more than six times as much of an antistatic agent as in the method of the present invention and the rolling conditions will be very strict. When the conventional method is applied to phonograph records, the reproduction of sounds will be unfavorable and, due to the large amount of the antistatic agent, there will be such fatal defects in appearance as stains and swells. Such defects will be caused because a part of the antistatic agent will be decomposed due to rolling. The decomposition product will perform a catalytic action and will decompose the resin material and the antistatic agent in an amount larger than is necessary will be kneaded into the resin. According to the present invention, the molding is made by means of a press adjusted to give within a short time fused-fluidity to the particles of the composite of a resin and others without such rolling. Therefore, the antistatic agent will be little decomposed but will be present in a stable state in the record disk, will not be unnecessarily mixed into the resin powder and will be sufficient with a small amount. Thus moldings very good in appearance and record disks excellent in tone quality can be obtained. The antistatic effect is so high that dusts in the air and approaching floating fine pieces of paper or cloth will not be adsorbed and a clean surface state can always be maintained.

According to the present invention, a powdered complex prepared by uniformly mixing such antistatic agent as stearamidopropyldimethyl-$\beta$-hydroxyethyl ammonium nitrate, Zelec NE (a trade name of a phosphoric acid ester of higher alcohol) or Catiogen L (a trade name of a quaternary ammonium salt) and such mold separating agent as stearic acid, stearic wax, stearic acid amide or dibutyl tin distearate with the fine powder of such resin for the base material of record disks as a vinyl chloride resin or a vinyl chloride-vinyl acetate copolymer resin is inserted between stampers and is heated and pressed. It has been confirmed that not only the mold separating effect can be thereby remarkably improved but also the specific signal-noise characteristics and high tone part reproducing characteristics in playing the record disks can be improved and the degree of wear of the records caused by the pressure of the needle in playing can be reduced.

Besides the above mentioned mold separating agents, such higher alcohol of about 11 to 17 carbon atoms as, for example, undecyl alcohol, dodecyl alcohol, myristyl alcohol or stearyl alcohol has some antistatic action as well as a mold separating action and has therefore an effect of reducing the amount of mixing an antistatic agent when such higher alcohol is used as a mold separating agent.

It is needless to say that a mold separating agent can be mixed with a resin stabilizing agent and a dye as well as an antistatic agent. If such additives are added and dissolved in a common solvent such as, for example, an alcohol, their dispersibility will be further promoted and there will be an advantage that uniform products will be obtained. The amount of addition of a mold separating agent will be most adequate at 0.1 to 1 part by weight against the resin of the base material of the record disk. The mold separating effect will be insufficient at an amount of less than 0.1 part. The amount of more than 1 part will be larger than is necessary and will not be recommendable. The powdered composite prepared by mixing said additive with the resin powder of the base material of record disks may be used as a powder as it is but may also be used as tablets or plates molded in advance under a pressure of 100 to 300 kg./cm.$^2$ at the normal temperature, 50 to 60° C. or a temperature lower than the rolling temperature of the resin used therein. In case such composite was preheated, was inserted between stampers and was heated and pressed by the normal method to manufacture record disks, even when 500 or more records were stamped, there was no trouble in separating the records from the molds and therefore to the tone quality of the records thus manufactured and the plated surfaces of the stampers were not adversely affected. It has been recognized that the antistatic effect of the records is substantially permanent. In the case of making records from a powdered composite mixed with no mold separating agent by the same method, the mold separation became a little worse when several hundred records had been made therefrom and some noises were recognized in the subsequently manufactured records. Therefore, it has been necessary to wipe the plated surfaces with cloth for every stamping and the tone quality has also been inferior. By the cooperative use of a mold separating agent, a remarkable improvement has been brought about.

We have discovered that, when a composite powder complex containing a resin powder for the base material of record disks and at least an antistatic agent is partly or wholly gelled by heating and pressing prior to heating and pressing in stamping, the tone quality will be improved and uniform products will be obtained. That is to say, according to the present invention, a semi-transparent or transparent molding in the form of a tablet or lamina is made by uniformly mixing an antistatic agent with the fine resin powder of the base material of record disks and pressing the mixture for several seconds to several minutes while giving such pressure and temperature as will fuse the resin; or, for example, at a temperature kept at 100 to 140° C. under a surface pressure of 200 to 250 kg./cm.$^2$ in the case of the fine powder of a vinyl chloride-vinyl acetate copolymer resin by putting the fine powder in a mold so that at least a part of the mixture may be gelled, is then preheated, is inserted between stampers and is heated under a pressure to manufacture a record disk. The antistatic effect of the records obtained by the method of the present invention is not different at all. As a part or all of the resin content is gelled by heating under a pressure when the mixture is molded into tablets or plates, the molding in the form of tablets and plates will be durable and will be convenient to handle. As the preheating before the stamping is carried out uniformly within a short time, there are advantages that record disks can be easily molded, the stampers will be little damaged and the life of the stampers will be elongated. As compared with the conventional method wherein the powder or the tablet is directly stamped, there are advantages in the present method in that the tone quality of the record is better, noises are less and uniform products can be obtained. When a coloring agent is added, the composite will be inserted between the stampers in the state wherein the coloring agent is dispersed in the once-fused resin and will be heated under a pressure and therefore the colored state will be very uniform.

In the present method, not only a coloring agent but also a resin stabilizing agent and a mold separating agent can be added to the resin of the base material of the record disks. Other additives than an antistatic agent are added to the base material. The mixture is hot rolled and then the dried solid is finely crushed by means of a crusher so as to be of a granularity of less than A.S.T.M. Sieve Series No. 50 screen. Even if the antistatic agent is then mixed in, the antistatic effect and the other effects of the present invention will be able to be obtained. However, in case said solid is crushed by means of a crusher, if the crushed pellets are too coarse, a large amount of the antistatic agent will be required or the pellets will not be suitable for the manufacture of record disks. It has been confirmed by experiments that, the finer the resin powder of the base material, the greater and the more durable the antistatic effect. In case a powder composite made by mixing an antistatic agent with the fine resin powder of the base material is contained in a mold and is molded into a tablet or plate by being heated under a pressure, if the thickness of the molding is too large, the pressing time required to gel the whole of the resin will be long. Therefore, it is desirable to make the thickness about 3 to 5 mm. Further, there is a substantially constant relationship between the heating temperature and the pressure on the surface in such case. If the pressing time is 20 to 60 seconds at 130 to 140° C. under about 200 kg./cm.$^2$ in the case of a vinyl chloride-vinyl acetate copolymer resin or at least 160 to 170° C. under about 250 kg./cm.$^2$ in the case of a vinyl chloride resin, all the resin will be gelled into a transparent tablet or plate.

Noises occurred in a very small number of the record disks manufactured by the above mentioned method. Such noises existed mostly in the fine parts of sound grooves. However, in case they were manufactured the same as in the above without adding any antistatic agent, no noise occurred in any one of more than 1000 records which were stamped. It is therefore evident that such noise is caused by the antistatic agent. From the fact that the occurrence of noises is periodical, it has become evident that the places causing noises are often partially distributed. It is therefore considered that the noises are caused by the compatibility of the vinyl chloride series resin and the antistatic agent, that is to say, that, when the composite of both is mixed by means of a blender or is molded into tablets, the antistatic agent will exist as mixed non-uniformly or that, when it is heated under a pressure beween stampers, the flow of the resin and that of the antistatic agent will be a little unbalanced, the noises being thus caused. The presence of the antistatic agent on the surface of the record disk is presumed to be because, when the record disk is to be stamped, it will be molded while no great fluctuation of the positions of the resin particles is given and, therefore, the antistatic agent existing between the respective resin particles gelled and fused together will capillarily float out on the surfaces through electron-microscopic capillary tubes. According to the present invention, the occurrence of noises has been eliminated by washing the surfaces of the record disk removed from the stampers with a liquid which is compatible with the antistatic agent and which does not act with the vinyl chloride resin or vinyl chloride copolymer resin to remove the antistatic agent present on the surfaces of the record disk. Better results have been obtained by washing them by pressing cloth impregnated with said liquid against them rather than by merely washing them. Water, warm water and alcohols are compatible with such antistatic agents as are mentioned above, do not act with vinyl chloride series resins and are therefore suitable for liquids for eliminating noises.

As a result of tests to see what the influence on the antistatic effect was like in case the surfaces of the record disk were washed with the above mentioned liquid according to the present invention, it was recognized that no change had been caused. That is to say, even by such tests as exposure to air for 6 months, boiling in water for 1 hour and exposure for 100 hours by means of a weather meter, the "semi-permanent antistatic effect" was not lost at all.

Such method as uniformly wiping by pressing lightly wrung cloth impregnated with such liquid against the surfaces of the record disk rotated as fitted on a turntable can be applied to the washing treatment of the surfaces of the record disk. Therefore, the treatment is very easy. If gauze boiled with a dilute alkali in advance or cotton flannel with the sizing agent removed by being well washed in advance is used for the cloth, better results will be obtained.

This method of eliminating noises by washing can be applied also to the case wherein a resin stabilizing agent, such mold separating agent as stearic acid and a coloring dye are mixed in the composition of the material of phonograph record disks.

The vinyl chloride resins and vinyl chloride-vinyl acetate copolymer resins used in the following examples were produced by Japanese Zeon Company, Ltd. (Nippon Zeon Kabushiki Kaisha) and were as follows:

| Trade names | Compositions | Average polymerization degrees |
|---|---|---|
| 400x150P | Vinyl chloride-vinyl acetate copolymer (12 to 15% vinyl acetate). | 450 |
| 400x150M | ----do---- | 600 |
| 400x150L | ----do---- | 400 |
| 103EP-8J | Vinyl chloride-vinyl acetate copolymer (about 3% vinyl acetate). | 750 |
| 103EP-8 | Vinyl chloride only | 800 |
| 103EP | ----do---- | 1,050 |

The granularity of each resin was 100% passing through A.S.T.M. Sieve Series No. 50 screen and more than 70% passing through A.S.T.M. Sieve Series No. 100 screen.

The commercial electrostatic potential measuring apparatus used in the examples was made in accordance with the description by A. S. Cross in The British Journal of Applied Physics, Supplement No. 2, p. 48, 1953.

*Example 1*

An ethyl alcohol solution of stearamidopropyldimethyl-β-hydroxyethyl ammonium nitrate which is an antistatic agent was sprayed onto the fine powder of a vinyl chloride-vinyl acetate copolymer resin of 12% vinyl acetate and an average polymerization degree of about 400 so that the fine resin powder might be coated with 0.7% by weight of the antistatic agent after the ethyl alcohol was volatilized. About 120 g. of the compound composite powder were preheated at 110 to 120° C., were inserted between stampers and were molded at a maximum temperature of about 140° C. under a maximum surface pressure of 50 kg./cm.$^2$ to make a phonograph record disk 10 inches in diameter. The surface resistance at 1 cm. between electrodes of this record disk at a relative humidity of 50% was about $10^9$ Ω. No absorbing action for dusts, paper fibers and cotton fibers was recognized at all. It is a requirement for an insulator generating no electrostatic charge that the surface resistance at 1 cm. between electrodes should be less than about $10^{10}$ Ω. The results of measurement of this record disk by means of a commercial electrostatic potential measuring apparatus showed values of +25 v. at the normal time and +28 v. after rubbing three times with a cotton buff at a distance of 2 cm. when the atmospheric temperature was 25° C. and the relative humidity was 60%. On the other hand, a record made in the same manner as in the above without the addition of any antistatic agent showed electrostatic potentials of −1500 v. at the normal time and −5000 v. after rubbing three times with a cotton buff.

*Example 2*

A suspension prepared by adding 10 parts of a 10% ethyl alcohol solution of antistatic agent stearamidopropyldimethyl-β-hydroxyethyl ammonium nitrate to a mixture of 1.5 parts of stabilizing agent dibasic lead stearate and 1.5 parts of coloring agent carbon, the parts being by weight, was sprayed onto 100 parts of a vinyl chloride-vinyl acetate copolymer resin powder of 15% vinyl acetate and an average polymerization degree of about 450 while being stirred so that the resin powder might be coated with a film of 1 part of said antistatic agent when the ethyl alcohol was volatilized. About 120 g. of the compound powder composite were formed into a tablet. The tablet was preheated to 110 to 120° C., was then inserted between stampers and was molded at a maximum temperature of 160° C. under a maximum surface pressure of about 170 kg./cm.$^2$ to make a phonograph record.

The surface resistance at 1 cm. between electrodes of this record at a relative humidity of 20% was about $10^9$ Ω. The results of measurement of this record by means of an electrostatic potential measuring apparatus showed electrostatic potentials of +25 v. at the normal time and +25 v. after rubbing three times with a cotton buff at an atmospheric tempermature of 25° C., a relative humidity of 60% and a distance of 2 cm.

*Example 3*

A compound powder composite was prepared by adding anion active agent Zelec NE (a trade name of a phosphoric acid ester type of a higher alcohol) as an antistatic agent to the fine powder of a vinyl chloride-vinyl acetate copolymer resin so that the fine resin powder might be coated with said antistatic agent and the antistatic agent might be 10% by weight against the resin when dried. A molding composite was prepared by mixing 20 parts of said powder composite with 100 parts of the fine powder of a resin of a 3% polyvinyl acetate average polymerization degree of about 750 only so that the antistatic agent might be about 2% by weight against the total amount of the resin. Said molding composite was molded into phonograph record disks at a maximum temperature of about 160–170° C. under a maximum surface pressure of 170 kg./cm.$^2$. The surface resistance at 1 cm. between electrodes as measured at a relative humidity of 50% was about $10^9$Ω. The results of measurement by means of an electrostatic potential measuring apparatus showed electrostatic potentials of +5 v. at the normal time and +15 v. after rubbing three times with a cotton buff at an atmospheric temperature of 25° C., a relative humidity of 60% and a distance of 2 cm.

Even when another anion active agent Elenon No. 19 or 1003 (both being trade names) was used in place of the antistatic agent of this example, the same results were obtained.

*Example 4*

A composite was prepared by forming a film of cation active agent Catiogen L (a trade name of a quaternary ammonium salt type) as an antistatic agent on the fine powder of polyvinyl acetate 12–15% average polymerization degree of about 450 so that the antistatic agent might be 0.3% by weight against the resin. Record disks were molded of this composite in accordance with the method of Example 1. The surface resistance at 1 cm. between electrodes as measured at a relative humidity of 50% was about $10^{10}$Ω.

The results of measurement by means of an electrostatic potential measuring apparatus showed electrostatic potentials of +50 v. at the normal time and +80 v. after rubbing three times with a cotton buff at an atmospheric temperature of 25° C., a relative humidity of 60% and a distance of 2 cm.

Even when alkyl pyridium salt Catiogen H (a trade name) known as another cation active agent was used in place of the antistatic agent of this example, substantially the same antistatic effect was obtained.

*Example 5*

Nonion active agent Elenon No. 9 as an antistatic agent was mixed with a vinyl chloride resin powder of an average polymerization degree of about 1050 known as Japanese Zeon 103EP (a trade name) so as to adhere to the resin powder so that a composite in which the antistatic agent was 2% against the resin might be prepared. About 120 g. of the composite powder, as it was, were taken, were preheated to 140° C., were inserted between stampers, were heated to a maximum temperature of about 160° C. and were subjected to a maximum surface pressure of 170 kg./cm.$^2$ to make a phonograph record disk 10 inches in diameter.

The surface resistance of this record disk at 1 cm. between electrodes at a relative humidity of 40% was about $10^8$Ω. The results of measurement by means of an electrostatic potential measuring apparatus showed electrostatic potentials of +5 v. at the normal time and +10 v. after rubbing three times with a cotton buff at an atmospheric temperature of 25° C., a relative humidity of 60% and a distance of 2 cm.

Even when Elenon No. 10 or a span series sorbitan fatty acid ester was used in place of Elenon No. 9 in this example, substantially the same result was obtained.

*Example 6*

A mixed solution prepared by dissolving 0.8 part of antistatic agent stearamidopropyldimethyl-β-hydroxyethyl ammonium nitrate, 0.1 part of mold separating agent stearic acid and 1.0 part of a tin series resin stabilizing agent (composed mainly of dibutyl tin dilaurate) in 2 parts of ethyl alcohol was added to 100 parts of the fine powder of a vinyl chloride-vinyl acetate copolymer resin of about 15% vinyl acetate and an average polymerization degree of about 450. The mixture was uniformly mixed in a mixer and was then heated to 60 to 70° C. to completely volatilize the ethyl alcohol. 120 g. of this compound powder composite were preheated to 120° C., were inserted between stampers and were molded into a record disk 10 inches in diameter at a maximum temperature of 160° C. under a load of a maximum surface pressure of 170 kg./cm.²

The mold separation was so good that, even after 800 record disks were molded, no fault was recognized in the stampers and record disks. The appearance of the record disk was good enough and no noise was caused at all. The reproduction of the tone quality was very favorable.

The measured value of the noise level after the wear of 50 times with a needle pressure of 20 g. in accordance with the Japanese Industrial Standard (JIS) by means of an endless record for testing the tone quality maintained initial 48 db. In the signal level measurement at 8 kc., the value fell from —10 to —20 db after 100 times with a needle pressure of 20 g. On the other hand, in the measurement of the noise level of a record disk made in the same manner without adding any mold separating agent, the noise increased from initial —48 to —42 db. In the signal level measurement, it became —25 db from —10 db. Thus the product of the present invention was proved to be superior in the tone quality.

The surface resistance at 1 cm. of this record disk surface at a relative humidity of 50% was about $10^9 \Omega$. Therefore, there was no action of adsorbing dusts and paper fibers. The results of measurement at a distance of 2 cm. by means of a commercial electrostatic potential measuring apparatus when the atmospheric temperature was 25° C. and the relative humidity was 60% showed only the values of +25 v. at the normal time and +30 v. after rubbing three times with a cotton buff.

Example 7

A mixed solution consisting of 0.5 part of antistatic agent stearamidopropyldimethyl-β-hydroxyethyl ammonium nitrate, 0.5 part of mold separating agent stearic wax and 3 parts of ethyl alcohol was added to 100 parts of the fine powder of a vinyl chloride-vinyl acetate copolymer resin of 15% vinyl acetate and an average polymerization degree of about 600. The mixture was uniformly blended by means of a blender and was then heated to 60 to 70° C. to completely volatilize the ethyl alcohol. 120 g. of this compound powder composite were formed into a tablet 125 mm. in diameter and 10 mm. thick at the normal temperature (or at 50 to 60° C.) and under a pressure of 100 to 200 kg./cm.². The tablet was heated to 120° C. in advance, was inserted between stampers and was molded into a record disk 10 inches in diameter at a maximum temperature of 160° C. and under a load of a maximum pressure of 170 kg./cm.². 800 record disks were thus made. The record disk of this example contained no stabilizing agent but mold separation was favorable. The record disk and stampers had no fault at all. The results of the tone quality test by means of an endless record and the antistatic effect were of the same degree as of Example 6.

Example 8

A compound powder composite obtained by adding a mixed solution of 1 part of anion active agent Zelec NE (a trade name of a phosphoric acid ester of a higher alcohol) as an antistatic agent, 1 part of mold separating agent amide stearate, 1.5 parts of a tin series resin stabilizing agent (composed mainly of dibutyl tin dilaurate) and 1 part of ethyl alcohol to 100 parts of the fine powder of a vinyl chloride-vinyl acetate copolymer resin of 12% vinyl acetate and an average polymerization degree of about 450 was employed in exactly the same operations as in Example 7 to mold record disks 10 inches in diameter. Even after 1000 record disks were made, no fault appeared in the record disk and stampers.

The tone quality tests made 10 times under a needle pressure of 6 g. followed by about 100 times under a needle pressure of 20 g. by using a Brüel KJAER high speed level recorder by means of an endless record were compared as follows:

The result of the measurement of the signal level at 8 kc. showed —20 db from —10 db. The result of the measurement of the noise level showed —44 db from —45 db.

On the other hand, in a record disk made without adding any mold separating agent in this example, the result of the measurement of the signal level showed —25 db from —11 db and the result of the measurement of the noise level showed —38 db from —45 db, thus the signal-noise ratio and wear test of the record disk of this example showed for better values and its antistatic effect was of a sufficient value.

Example 9

A compound powder composite obtained by adding a mixed solution of 1.0 part of antistatic agent Zelec NE, 0.3 part of mold separating agent dibutyl tin distearate, 0.7 part of resin stabilizing agent dibutyl tin dilaurate and 3 parts of ethyl alcohol to 100 parts of a vinyl chloride-vinyl acetate copolymer of 12% vinyl acetate and an average polymerization degree of about 600 was employed in the same manner as in Example 7 to make 1000 record disks 10 inches in diameter. In the wear test by means of an endless record, they were shown to be superior to those made without adding any mold separating agent by about 4 db in the signal level and about 5 db in the noise level and their antistatic effect was sufficient.

Example 10

A mixed solution consisting of 0.7 part of antistatic agent stearamidopropyldimethyl-β-hydroxyethyl ammonium nitrate, 0.1 part of mold separating agent stearic acid, 1.0 part of a tin series resin stabilizing agent (composed mainly of dibutyl tin dilaurate), 1 part of a celliton dye and 3 parts of ethyl alcohol was added to 100 parts of the fine powder of a vinyl chloride-vinyl acetate copolymer resin of 15% vinyl acetate and an average polymerization degree of about 450. The mixture was well uniformly mixed by means of a mixer and was heated to 60 to 70° C. to volatilize the ethyl alcohol. The thus obtained compound powder composite was subjected to a pressure of 200 to 250 kg./cm.² at 100 to 130° C. to have the resin gelled and was molded into semi-transparent or transparent laminae. 120 g. of said molded lamina were molded into a 10 inch record disk in the same manner as in Example 7.

The mold separation and antistatic effect of this record plate were sufficient. The results of the wear test by means of an endless record showed values superior by 4 to 5 db to those molded without adding any mold separating agent.

Example 11

A compound powder composite obtained by adding a mixed solution consisting of 1.0 part of antistatic agent stearamidopropyldimethyl-β-hydroxyethyl ammonium nitrate, 1.0 part of mold separating agent stearic acid, 1.5 parts of a tin series resin stabilizing agent (composed mainly of dibutyl tin dilaurate) and 2 parts of ethyl alcohol to 100 parts of the fine powder of a vinyl chloride resin known with the trade name of Japanese Zeon 103EP-8 of an average polymerization degree of about 800 was employed in the same operations as in Example 7. A tablet was formed of about 120 g. of said composite. This tablet was preheated to 160 to 170° C., was inserted between stampers and was molded into a 10 inch record disk under the conditions of a maximum temperature of 170° C. and a maximum pressure of 180 kg./cm.²

The mold separation and antistatic effect of this record disk were remarkably favorable. Even after stamping several hundred times, the record disks and stampers remained favorable. In the wear test by means of an endless record, values better by 4 to 5 db than of those made without adding any mold separating agent were obtained.

Example 12

A mixed solution consisting of 0.4 part of antistatic agent stearamidopropyldimethyl-β-hydroxyethyl ammonium nitrate, 0.8 part of mold separating agent dodecyl alcohol, 1.0 part of a tin series resin stabilizing agent (composed mainly of dibutyl tin dilaurate) and 3 parts of ethyl alcohol was added to 100 parts of the fine powder of vinyl chloride-vinyl acetate copolymer of about 12% polyvinyl acetate average polymerization degree of about 400. The mixture was mixed by means of a blender for 30 minutes, was then kept at a temperature of 70 to 80° C. and was further mixed for 30 minutes to volatilize the ethyl alcohol and to thereby prepare a compound powder composite. 180 g. of this compound powder composite were molded into a tablet 155 mm. in diameter and 10 mm. thick at the normal temperature under a pressure of 150 kg./cm.² A record disk 12 inches in diameter was molded of the tablet in the same manner as in Example 7. Thus, 500 record disks were made.

The separation of the record disk of this example from the stampers was remarkably favorable. No fault was caused to the record disks and stampers. The results of the tone quality test by means of an endless record showed that the noise level was better by 5 db and the signal level at 8 kc. was better by 5 to 10 db than of those made without adding any dodecyl alcohol. In the test of the antistatic effect, the surface resistance at 1 cm. of the surface of this record disk at a relative humidity of 60% was about $10^9$ Ω. The results of measurement by means of a commercial electrostatic potential measuring apparatus showed values of +35 v. at the normal time and +45 v. after rubbing three times with a cotton buff. Even when undecyl alcohol, myristyl alcohol or stearyl alcohol was used in place of dodecyl alcohol, exactly the same effects as in the above example were recognized.

Example 13

A compound powder composite obtained by adding an ethyl alcohol mixed solution consisting of 1 part of antistatic agent stearamidopropyldimethyl-β-hydroxyethyl ammonium nitrate, 0.1 part of mold separating agent stearic acid and 1.5 parts of ethyl alcohol to 100 parts of the fine powder of a vinyl chloride-vinyl acetate copolymer resin of about 12% vinyl acetate and an average polymerization degree of about 450, the parts being by weight, well mixing the mixture by means of a mixer and volatilizing the ethyl alcohol was heated to 130 to 140° C., was put into a mold kept at the same temperature and was pressed under a surface pressure of 200 kg./cm.² for 20 seconds to obtain plates about 4 mm. thick. About 120 g. of the molded plate were preheated to 120 to 130° C., were inserted between stampers and were pressed at a maximum temperature of 150° C. under a maximum pressure of 100 kg./cm.² to make a record disk 10 inches in diameter. The surface resistance at 1 cm. of the surface of this record disk at a relative humidity of 50% was about $10^9$ Ω. Therefore, there was no action of adsorbing dusts and paper fibers. The results of measurement at a distance of 2 cm. by means of a commercial electrostatic potential measuring apparatus at 25° C. and a relative humidity of 60% showed values of +25 v. at the normal time and +30 v. after rubbing three times with a cotton buff. These values little varied even after the record disk was washed with water, soaked in warm water, washed with soap and tested for 100 hours by means of a weather meter. Thus, the antistatic object was recognized to be completely attained.

The surface resistance of the surface of a record disk made in the same manner as in the above without adding any antistatic agent in this example was more than $10^{13}$ Ω at a relative humidity of 60%. The electrostatic potential thereof at a relative humidity of 50% was —1500 v. at the normal time and —5000 v. after rubbing three times with a cotton buff.

Example 14

A compound powder composite obtained by adding an ethyl alcohol mixed solution consisting of 0.5 part of antistatic agent stearamidopropyldimethyl-β-hydroxyethyl ammonium nitrate, 1.5 parts of a tin series resin stabilizing agent (composed mainly of dibutyl tin dilaurate), 0.1 part of a celliton color as a dye and 3 parts of ethyl alcohol to 100 parts of the fine powder of a vinyl chloride-vinyl acetate copolymer resin of about 12% vinyl acetate and an average polymerization degree of about 600, the parts being by weight, uniformly mixing the mixture by means of a blender and then volatilizing the ethyl alcohol was heated to 100 to 110° C., was put into a mold kept at the same temperature and was subjected to a surface pressure of 250 kg./cm.² for about 60 seconds to make semi-transparent tablets. The tablet was preheated to 130° C., was then inserted between stampers and was pressed under a load of a maximum pressure of 170 kg./cm.² at a maximum temperature of 140° C. to mold a 10 inch record disk. The inherent surface resistance at 1 cm. between electrodes of this record disk at a relative humidity of 20% was $10^9$ Ω. The electrostatic potential measured at a distance of 2 cm. at a relative humidity of 60% was +30 v. at the normal time and +35 v. after rubbing three times with a cotton buff. The coloring was uniform and a beautiful appearance was given.

The amount of addition of the coloring agent could be optionally selected to be in a range of 1 to 0.01 part by weight against 100 parts of the base material resin powder.

Example 15

A compound powder composite prepared by adding an ethyl alcohol solution consisting of 1 part of antistatic agent Zelec NE (a trade name), 2.0 parts of a tin series resin stabilizing agent (composed mainly of dibutyl tin dilaurate), 0.1 part of mold separating agent stearic acid and 3 parts of ethyl alcohol to 100 parts of the fine powder of a vinyl chloride resin known with the trade name of Japanese Zeon 103EP of an average polymerization degree of about 1050, the parts being by weight, and heating the mixture to 70° C. to volatilize the ethyl alcohol was pressed at 160 to 170° C. under 250 kg./cm.² to mold plates about 4 mm. thick. The plate was preheated to 160 to 170° C., was then inserted between stampers and was molded into a 10 inch record disk under the conditions of a maximum temperature of 160° C. and a maximum surface pressure of 170 kg./cm.². The results of the measurement of the electrostatic potential of this record disk were substantially the same as in the case of Example 14.

Example 16

A mixture prepared by adding 1.5 parts of coloring agent carbon powder and 1.5 parts of resin stabilizing agent dibasic lead stearate to 100 parts of the fine powder of a vinyl chloride-vinyl acetate copolymer resin of about 12% vinyl acetate and an average polymerization degree of about 450, the parts being by weight, was rolled by means of a Banbury roll, was made a lamina, was then crushed by means of a crusher into a powder of less than A.S.T.M. Sieve Series No. 50 screen. A compound powder composite prepared by adding an alcohol mixed solution consisting of 0.8 part of antistatic agent stearamidopropyldimethyl-β-hydroxyethyl ammonium nitrate and 2 parts of ethyl alcohol to 100 parts of said powder, the parts being by weight, uniformly mixing the mixture and then volatilizing the ethyl alcohol was heated and pressed at 120 to 130° C. under 200 kg./cm.² to make plates about 4 mm. thick. The record disk molded of said plate in the same manner as in Example 13 had the same antistatic effect as in the above example.

*Example 17*

A compound powder prepared by adding a solution consisting of 1 part of a tin series stabilizing agent (composed mainly of dibutyl tin dilaurate), 0.05 part of stearic acid, 0.7 part of antistatic agent stearamidopropyl-dimethyl-$\beta$-hydroxyethyl ammonium nitrate and 3 parts of ethyl alcohol to 100 parts of the fine powder of a vinyl chloride-vinyl acetate copolymer resin of about 12% vinyl acetate and an average polymerization degree of about 600, the parts being by weight, uniformly mixing the mixture by means of a mixer and then volatilizing the ethyl alcohol was preheated to 130° C. as it was, was directly inserted between stampers and was molded into a 10 inch record disk under a load of a maximum pressure of about 170 kg./cm.² at a maximum temperature of 150° C. There were some noises in 20% of the record disks manufactured in this method with the same stampers. When the surfaces of such record disks causing noises were washed with cotton flannel impregnated with warm water at 50 to 70° C. pressed against the surfaces, the noises could be completely eliminated. The surface resistance of those washed record disks as measured at a relative humidity of 50% was $10^8$ Ω cm. The electrostatic potential at a distance of 2 cm. as measured by means of a commercial electrostatic potential measuring apparatus at 25° C. and a relative humidity of 60% was only +20 v. at the normal time and +30 v. after rubbing with cotton cloth.

*Example 18*

A compound powder prepared by adding a solution consisting of 1.5 parts of a tin series stabilizing agent (composed mainly of dibutyl tin dilaurate), 0.1 part of stearic acid, 0.8 part of antistatic agent anion active agent high grade alcohol phosphoric acid ester and 2 parts of ethyl alcohol to 100 parts of the fine powder of a vinyl chloride-vinyl acetate of about 12% vinyl acetate and an average polymerization degree of about 450, the parts being by weight, well mixing the mixture by means of a blender and then volatilizing the ethyl alcohol was molded into tablets each 10 cm. in diameter and weighing about 60 g. at the normal temperature. Two of such tablets were preheated to about 120° C., were inserted between stampers and were molded at a maximum temperature of 150° C. under a maximum pressure of about 150 kg./cm.² to make a 10 inch record disk. There were some noises in about 30% of the products made with the same stampers in this method. When such record disk causing noises was washed with gauze impregnated with an aqueous solution of 50% ethyl alcohol at 40° C. pressed against the surface of the record disk while rotated as fitted on a turntable, the noises could be eliminated.

*Example 19*

A compound powder obtained by adding a solution consisting of 1.5 parts of a tin series stabilizing agent (composed mainly of dibutyl tin dilaurate), 1 part of antistatic agent stearamidopropyldimethyl-$\beta$-hydroxyethyl ammonium nitrate, 0.1 part of stearic acid, 0.1 part of a celliton dye and 2 parts of ethyl alcohol to 100 parts of the fine powder of a vinyl chloride resin known as Japanese Zeon 103EP (a trade name) of an average polymerization degree about 1050, the parts being by weight, well mixing the mixture and then volatilizing the ethyl alcohol was put into a mold and was molded into plates at 50 to 170° C. under a pressure of 100 to 250 kg./cm.². The plate was preheated to 170° C. and was subjected to a load of a maximum surface pressure of 170 kg./cm.² at a maximum temperature of 170° C. to make a 10 inch record disk. When 500 products were made with the same stampers in this method, noises occurred in about 30% of those record disks. However, by the same treatment as in Example 18, the noises could be eliminated.

As exemplified in the above examples, according to the present invention, a powder composite prepared by adding an antistatic agent to the fine powder of a base material resin is inserted between stampers as it is, as molded into a tablet or as a transparent plate (or tablet) made by gelling the powder composite by heating it under a pressure below the rolling temperature of the resin and is heated and pressed to mold a record disk and a washing treatment can be applied to the record disk.

What we claim is:

1. A method of manufacturing antistatic record disks comprising: (1) mixing 0.2 to 2% by weight of at least one antistatic agent with a powder, the major proportion of which is at least one resin selected from the group consisting of polyvinyl chloride and vinyl chloride copolymers, whereby a composite powder complex is formed; and (2) molding said powder complex at a maximum temperature of 140° to 170° C. under a maximum surface pressure of 50 to 180 kg./cm.², the flow of composite particles being less than that sufficient to destroy the physical relationship between the relative position of resin particles and antistatic agent on the surface of the resulting disk.

2. A method of manufacturing antistatic record disks comprising: (1) coating fine powder of a vinyl chloride-vinyl acetate copolymer resin of about 12% vinyl acetate and an average polymerization degree of about 400 with 0.7% by weight of an ethyl alcohol solution of stearamidopropyldimethyl-$\beta$-hydroxyethyl ammonium nitrate, (2) volatilizing the ethyl alcohol whereby a composite powder complex is obtained, (3) inserting said powder complex between stampers and (4) molding at a maximum temperature of 140° C. under a maximum surface pressure of 50 kg./cm.², whereby the flow of coated resin powder is less than that sufficient to destroy the physical relationship between the relative position of resin particles and stearamidopropyldimethyl-$\beta$-hydroxyethyl ammonium nitrate on the surface of the resulting disk.

3. A method of manufacturing antistatic record disks which comprises: (1) mixing in the absence of fluid flow of resin 20 parts by weight of a composite powder composite powder complex with 100 parts by weight of resin powder, said resin complex constituting a dried admixture, prepared in the absence of increased temperature and pressure, of 10% by weight of an anion active aliphatic alcohol phosphoric acid ester salt type antistatic solution with the resin powder which is a vinyl chloride-vinyl acetate copolymer resin powder of about 3% vinyl acetate and an average polymerization degree of about 750, (2) inserting the resulting mixture between stampers and (3) molding said admixture at a maximum temperature of from 160 to 170° C. under a maximum surface pressure of 50 kg./cm.², whereby the flow of coated resin powder is less than that sufficient to destroy the physical relationship between the relative position of resin particles and antistatic agent on the surface of the resulting disk.

4. A method of manufacturing antistatic record disks comprising: (1) mixing in the absence of added heat and pressure 0.3 parts by weight of a cation active agent quaternary ammonium salt type antistatic agent solution with 100 parts of a vinyl chloride-vinyl acetate copolymer resin powder of 12–15% vinyl acetate and an average polymerization degree of about 450 and drying the mixture, whereby a composite powder complex is obtained, (2) inserting said powder complex between stampers and (3) molding at a maximum temperature of 140° C. under a maximum surface pressure of 50 kg./cm.², whereby the flow of coated resin powder is less than that sufficient to destroy the physical relationship between the relative position of resin particles and antistatic agent on the surface of the resulting disk.

5. A method of manufacturing antistatic record disks comprising: (1) mixing in the absence of added heat and pressure 2 parts of a nonion active agent polyethylene glycol alkyl ester type antistatic agent solution with 100 parts of a vinyl chloride resin powder of an average polymerization degree of 1050, the parts being by weight, and drying the mixture, whereby a composite powder complex is obtained, (2) inserting said power complex between stampers and (3) molding the inserted complex at a maximum temperature of 160° C. under a maximum surface pressures of 170 kg./cm.$^2$, whereby the flow of coated resin power is less than that sufficient to destroy the physical relationship between the relative position of resin particles and antistatic agent on the surface of the resulting disk.

6. A method of manufacturing antistatic record disks comprising: (1) adding a mixed solution consisting of 0.8 part of stearamidopropyldimethyl-β-hydroxyethyl ammonium nitrate, 0.1 part of stearic acid, 1.0 part of a stabilizing agent composed predominantly of dibutyl tin dilaurate, and 2 parts of ethyl alcohol to 100 parts of a vinyl chloride-vinyl acetate copolymer resin powder of about 15% vinyl acetate and an average polymerization degree of about 450, the parts being by weight, (2) mixing in the absence of increased temperature and pressure the product, (3) volatilizing the ethyl alcohol, whereby a composite powder complex is obtained, (4) inserting said powder complex between stampers and (5) molding the inserted powder complex at a maximum temperature of 160° C. under a maximum surface pressure of 170 kg./cm.,$^2$ whereby the flow of coated resin powder is less than that sufficient to destroy the physical relationship between the relative position of resin particles and stearamidopropyldimethyl-β-hydroxyethyl ammonium nitrate on the surface of the resulting disk.

7. A method of manufacturing antistatic record disks comprising: (1) mixing in the absence of increased temperature and pressure a solution consisting of 0.5 part of stearamidopropyldimethyl-β-hydroxyethyl ammonium nitrate, 0.5 part of stearic wax and 3 parts of ethyl alcohol with 100 parts of a vinyl chloridevinyl acetate copolymer resin powder of 15% vinyl acetate and an average polymerization degree of 400, (2) volatilizing the ethyl alcohol, whereby a composite powder complex is obtained, (3) forming a tablet of said composite powder complex, (4) inserting said tablet between stampers and (5) molding the inserted tablet at a maximum temperature of 160° C. under a maximum surface pressure of 170° kg./cm.$^2$, whereby the flow of coated resin powder is less than that sufficient to destroy the physical relationship between the relative position of resin particles and stearamidopropyldimethyl-β-hydroxyethyl ammonium nitrate on the resulting disk.

8. A method of manufacturing antistatic record disks comprising: (1) adding a mixed solution of 1 part of an anion active agent aliphatic alcohol phosphoric acid ester salt type antistatic agent, 1 part of stearic acid amide, 1.5 parts of a stabilizing agent composed predominantly of dibutyl tin dilaurate, and 1 part of ethyl alcohol to 100 parts of a vinyl chloride-vinyl acetate copolymer resin powder of about 12% vinyl acetate and an average polymerization degree of about 600, the parts being by weight, (2) mixing the product in the absence of increased temperature and pressure and (3) volatilizing the ethyl alcohol, whereby a composite powder complex is obtained, (4) forming a tablet of said powder complex, (5) inserting said tablet between stampers and (6) molding the inserted tablet at a maximum temperature of 160° C. under a maximum surface pressure of 170 kg./cm.$^2$, whereby the flow of coated resin powder is less than that sufficient to destroy the physical relationship between the relative position of resin particles and antistatic agent on the surface of the resulting disk.

9. A method of manufacturing antistatic record disks comprising: (1) mixing in the absence of increased temperature and pressure a solution of 1.0 part of an anion active agent aliphatic alcohol phosphoric acid ester salt type antistatic agent, 0.3 part of mold separating agent dibutyl tin distearate, 0.7 part of stabilizing agent dibutyl dilaurate and 3 parts of ethyl alcohol with 100 parts of a vinyl chloride-vinyl acetate copolymer resin powder of about 3% vinyl acetate and an average polymerization degree of about 750, (2) volatilizing the ethyl alcohol, whereby a composite powder complex is obtained, (3) forming a tablet of said composite powder complex, (4) inserting said tablet between stampers and (5) molding the tablet at a maximum temperature of 160° C. under a maximum surface pressure of 170 kg./cm.$^2$, whereby the flow of coated resin powder is less than that sufficient to destroy the physical relationship between the relative position of resin particles and antistatic agent on the surface of the resulting disk.

10. A method of manufacturing antistatic record disks comprising: (1) mixing in the absence of increased temperature and pressure a solution consisting of 0.7 part of stearamidopropyldimethyl-β-hydroxyethyl ammonium nitrate, 0.1 part of stearic acid, 1 part of a stabilizing agent composed predominantly of dibutyl tin dilaurate, 1 part of a celliton dye and 3 parts of ethyl alcohol with 100 parts of a vinyl chloride-vinyl acetate copolymer resin powder of about 15% vinyl acetate and an average polymerization degree of about 450, the parts being by weight, (2) volatilizing the ethyl alcohol whereby a composite powder complex is obtained, (3) forming a tablet of said powder complex, (4) inserting said tablet between stampers and (5) molding the inserted tablet at a maximum temperature of 160° C. under a maximum surface pressure of 170 kg./cm.$^2$, whereby the flow of coated resin powder is less than that sufficient to destroy the physical relationship between the relative position of resin particles and stearamidopropyldimethyl-β-hydroxyethyl ammonium nitrate of the surface of the resulting disk.

11. A method of manufacturing antistatic record disks comprising: (1) adding a mixed solution consisting of 1 part of stearamidopropyldimethyl-β-hydroxethyl ammonium nitrate, 1 part of stearic acid, 1.5 parts of a stabilizing agent composed predominantly of dibutyl tin dilaurate, and 2 parts of ethyl alcohol to 100 parts of a vinyl chloride resin powder of an average polymerization degree of about 800, the parts being by weight, (2) mixing the product in the absence of increased temperature and pressure, (3) volatilizing the ethyl alcohol whereby a composite powder complex is obtained, (4) forming a tablet of said powder composite, (5) inserting said tablet between stampers and (6) molding the inserted tablet at a maximum temperature of 170° C. under a maximum surface pressure of 180 kg./cm.$^2$, whereby the flow of coated resin powder is less than that sufficient to destroy the physical relationship between the relative position of resin particles and stearamidopropyldimethyl-β-hydroxyethyl ammonium nitrate on the surface of the resulting disk.

12. A method of manufacturing antistatic record disks comprising: (1) mixing in the absence of increased temperature and pressure a solution consisting of 0.4 part of stearamidopropylidimethyl -β-hydroxyethyl ammonium nitrate, 0.8 part of dodecyl alcohol, 1 part of a stabilizing agent composed predominantly of dibutyl tin dilaurate, and 3 parts of ethyl alcohol with 100 parts of a vinyl chloride-vinyl acetate copolymer resin powder of about 12% vinyl acetate and an average polymerization degree of about 600, the parts being by weight, (2) volatilizing ethyl alcohol whereby a composite powder complex is obtained, (3) forming a tablet of said composite powder complex, (4) inserting said tablet between stampers and (5) molding the inserted tablet at a maximum temperature of 160° C. under a maximum surface pressure of 170 kg./cm.$^2$, whereby the flow of coated resin powder is less than that sufficient to destroy the physical relationship between the relative position of resin particles and stearamidopropyldimethyl-β-hydroxyethyl ammonium nitate on the surface of the resulting disk.

13. A method of manufacturing antistatic record disks which comprises coating powder particles of at least one resin selected from the group consisting of polyvinyl chloride resin and vinyl chloride-vinyl acetate copolymer resin with from 0.2 to 2% by weight of an antistatic agent, whereby a composite powder complex is formed, inserting said composite powder complex into a mold and subjecting it to a surface pressure of from 200 to 250 kg./cm.$^2$ at a temperature from 130 to 170° C. whereby a molding is produced in which at least a part of said composite powder complex is gelled, inserting said molding between stampers and molding at a maximum temperature of from 140° to 170° C. under a maximum surface pressure of from 50 to 180 kg./cm.$^2$, whereby the flow of coated resin powder is less than that sufficient to destroy the physical relationship between the relative position of resin particles and antistatic agent on the surface of the resulting disk.

14. A method of manufacturing antistatic record disks which comprises (I) mixing in the absence of fluid resin flow (1) a solution consisting of (a) one part of stearamidopropyl-dimethyl-β-hydroxyethyl ammonium nitrate, (b) 0.1 part of stearic acid and (c) 1.5 parts of ethyl alcohol with (2) 100 parts of a vinyl chloride-vinyl acetate copolymer resin powder of about 12% ethyl acetate and an average polymerization degree of about 450, the parts being by weight, (II) volatilizing the ethyl alcohol, whereby a composite powder complex is formed, (III) pressing said complex into a plate at a temperature of from 130 to 140° C. and under a surface pressure of 200 kg./cm.$^2$ and (IV) inserting the plate between stampers and molding same at a maximum temperature of 150° C. under a maximum surface pressure of 100 kg./cm.$^2$, whereby the flow of coated resin powder is less than that sufficient to destroy the physical relationship between the relative position of resin particles and stearamidopropyldimethyl-β-hydroxyethyl ammonium nitrate on the surface of the resulting disk.

15. A method of manufacturing antistatic record disks which comprises (I) mixing in the absence of fluid resin flow (1) a solution consisting of (a) 0.5 part of stearamidopropyl-dimethyl-β-hydroxyethyl ammonium nitrate, (b) 1.5 parts of a stabilizing agent composed mainly of dibutyl tin dilaurate, (c) 0.1 part of a celliton dye, and (d) 3 parts of ethyl alcohol with (2) 100 parts of a vinyl chloride-vinyl acetate copolymer resin powder of about 12% vinyl acetate and an average polymerization degree of about 600, the parts being by weight, (II) volatilizing the ethyl alcohol, whereby a composite powder complex results, molding said composite powder complex into a semi-transparent tablet at a temperature of from 100 to 110° C. under a surface pressure of 250 kg./cm.$^2$, (III) inserting said tablet between stampers and (IV) molding said tablet into a record disk at a maximum temperature of 140° C. under a maximum pressure of 170 kg./cm.$^2$, whereby the flow of coated resin powder is less than that sufficient to destroy the physical relationship between the relative position of resin particles and stearamidopropyldimethyl-β-hydroxyethyl ammonium nitrate on the surface of the resulting disk.

16. A method of manufacturing antistatic record disks which comprises (I) adding to 100 parts of a vinyl chloride resin of an average polymerization degree of about 1050 a solution consisting of one part of anion active agent aliphatic alcohol phosphoric acid ester salt type antistatic agent, two parts of a stabilizing agent composed mainly of dibutyl tin dilaurate, 0.1 part of stearic acid and 3 parts of ethyl alcohol, the parts being by weight, (II) volatilizing the ethyl alcohol, whereby a composite powder complex is formed, (III) pressing said composite complex into a plate molding at a temperature of from 160 to 170° C. under a surface pressure of 250 kg./cm.$^2$, (IV) inserting the plate molding between stampers, and (V) molding the plate molding into a record disk at a maximum temperature of 160° C. under a maximum surface pressure of 170 kg./cm.$^2$, whereby the flow of coated resin powder is less than that sufficient to destroy the physical relationship between the relative position of resin particles and antistatic agent on the surface of the resulting disk.

17. A method of manufacturing antistatic record disks which comprises (I) adding 1.5 parts of carbon powder and 1.5 parts of dibasic lead stearate to 100 parts of vinyl chloride-vinyl acetate copolymer resin powder of about 12% vinyl acetate and an average polymerization degree of about 400, the parts being by weight, (II) rolling the product, (III) crushing the rolled product into a powder, (IV) adding to 100 parts of the powder a solution consisting of 0.8 part of stearamidopropyldimethyl-β-hydroxyethyl ammonium nitrate and two parts of ethyl alcohol, the parts being by weight, and admixing the product in the absence of fluid flow of the resin, (V) volatilizing the ethyl alcohol, whereby a composite powder complex is formed, (VI) pressing the composite powder complex at a temperature of 120° to 130° C. under a pressure of 200 kg./cm.$^2$ into a plate molding, (VII) inserting said plate molding between stampers and (VIII) molding said plate molding into a record disk at a maximum temperature of 150° C. under a maximum surface pressure of 100 kg./cm.$^2$, whereby the flow of coated resin powder is less than that sufficient to destroy the physical relationship between the relative position of resin particles and stearamidopropyldimethyl-β-hydroxyethyl ammonium nitrate on the surface of the resulting disk.

18. A method of manufacturing antistatic record disks which comprises (I) adding a solution consisting of one part of a stabilizing agent composed mainly of dibutyl tin dilaurate, 0.05 part of stearic acid, 0.7 part of stearamidopropyldimethyl-β-hydroxyethyl ammonium nitrate, and three parts of ethyl alcohol to 100 parts of a vinyl chloride-vinyl acetate copolymer resin powder of about 12% vinyl acetate and an average polymerization degree of about 600, the parts being by weight, (II) admixing the product in the absence of fluid resin flow, (III) volatilizing the ethyl alcohol, whereby a composite powder complex is formed, (IV) inserting said complex between stampers and molding same into a record disk at a maximum temperature of 150° C. under a maximum surface pressure of 170 kg./cm.$^2$, whereby the flow of coated resin powder is less than that sufficient to destroy the physical relationship between the relative position of resin particles and stearamidopropyldimethyl-β-hydroxyethyl ammonium nitrate on the surface of the resulting disk, and (V) washing the surfaces of the record disk with warm water.

19. A method of manufacturing antistatic record disks which comprises (I) adding (1) a mixed solution consisting of (a) 0.8 part of an anion active agent aliphatic alcohol phosphoric acid ester salt type antistatic agent, (b) 1.5 parts of a stabilizing agent composed mainly of dibutyl tin dilaurate, (c) 0.1 part of stearic acid and (d) two parts of ethyl alcohol to (2) 100 parts of a vinyl chloride-vinyl acetate copolymer resin powder of about 12% vinyl acetate and an average polymerization degree of about 450, the parts being by weight, (II) mixing the product in the absence of resin fluid flow, (III) volatilizing the ethyl alcohol, whereby a composite powder complex is formed, (IV) forming tablets from said composite powder complex, (V) inserting said tablets between stampers and molding into record disks said tablets at a maximum temperature of 150° C. under a maximum surface pressure of 150 kg./cm.$^2$, whereby the flow of coated resin powder is less than that sufficient to destroy the physical relationship between the relative position of resin particles and antistatic agent on the surface of the resulting disk, and (VI) washing the surfaces of the record disk with a warm aqueous solution of ethyl alcohol.

20. A method of manufacturing antistatic record disks which comprises (I) adding (1) a mixed solution consisting of (a) one part of stearamidopropyldimethyl-β-hydroxyethyl ammonium nitrate, (b) 0.1 part of stearic acid, (c) 0.1 part of celliton dye and (d) two parts of ethyl alcohol to (2) 100 parts of a vinyl chloride resin powder of an average polymerization degree of about 1050, the parts being by weight, (II) mixing the product in the absence of resin fluid flow, (III) volatilizing the ethyl alcohol, whereby a composite powder complex of finely divided resin particles coated, inter alia, with stearamidopropyldimethyl - β - hydroxyethyl ammonium nitrate is formed, (IV) inserting said composite powder complex into a mold and pressing same at a temperature from 50° to 170° C. under a pressure of from 100 to 250 kg./cm.$^2$ into a plate molding, (V) inserting said plate molding between stampers and molding same into a record disk at a maximum temperature of 170° C. under a maximum surface pressure of 170 kg./cm.$^2$, whereby the flow of coated resin powder is less than that sufficient to destroy the physical relationship between the relative position of resin particles and stearamidopropyldimethyl-β-hydroxyethyl ammonium nitrate on the surface of the resulting disk, and (VI) washing the surfaces of the record disk with a warm aqueous solution of ethyl alcohol.

21. A method of manufacturing antistatic record disks which comprises molding coated finely divided particles of resin powder at a sufficiently low temperature and pressure to maintain the basic physical relationship between the resin particles and the surrounding antistatic agent in the surface portion of the resulting molded article, said resin being selected from the group consisting of polyvinyl chloride and a vinyl chloride copolymer.

22. A method of manufacturing antistatic record disks which comprises: (1) coating particles of a resin powder with an antistatic agent, said resin being selected from the group consisting of polyvinyl chloride and a vinyl chloride copolymer, and (2) molding the resulting coated particles of resin powder at a maximum temperature of 170° C. and under a maximum surface pressure of 180 kg./cm.$^2$, whereby the flow of coated resin powder is less than that sufficient to destroy the physical relationship between the relative position of resin particles and antistatic agent on the surface of the resulting disk.

References Cited in the file of this patent

UNITED STATES PATENTS

| | | |
|---|---|---|
| 1,932,889 | Groff | Oct. 31, 1933 |
| 2,579,375 | Eisen | Dec. 18, 1951 |

FOREIGN PATENTS

| | | |
|---|---|---|
| 720,023 | Great Britain | Dec. 15, 1954 |

OTHER REFERENCES

Hayek: Anti Static Finishes for Textiles, Amer. Dyestuff Reporter, pp. 368–371, June 7, 1954.